United States Patent
Hill et al.

(10) Patent No.: US 6,816,284 B1
(45) Date of Patent: Nov. 9, 2004

(54) MULTISPECTRAL COLOR REPRODUCTION SYSTEM WITH NONLINEAR CODING

(75) Inventors: Bernhard Hill, Aachen (DE); Friedhelm König, Aachen (DE)

(73) Assignee: Color Aix Perts GmbH, Aachen (DE)

( * ) Notice: Subject to any disclaimer, the term of this patent is extended or adjusted under 35 U.S.C. 154(b) by 0 days.

(21) Appl. No.: 09/545,158

(22) Filed: Apr. 7, 2000

(51) Int. Cl.$^7$ ............................ G06F 15/00; G06K 9/00
(52) U.S. Cl. .......................................... 358/1.9; 382/167
(58) Field of Search ........................ 358/1.9, 500, 518, 358/529, 535, 539, 530; 382/166, 167, 162

(56) References Cited

U.S. PATENT DOCUMENTS

| | | | | |
|---|---|---|---|---|
| 4,663,662 A | * | 5/1987 | Sekizawa et al. | 358/530 |
| 4,926,251 A | * | 5/1990 | Sekizawa et al. | 358/535 |
| 5,122,783 A | * | 6/1992 | Bassetti, Jr. | 345/88 |
| 5,319,472 A | * | 6/1994 | Hill et al. | 358/500 |
| 5,333,212 A | * | 7/1994 | Ligtenberg | 382/250 |
| 5,461,493 A | * | 10/1995 | Venable | 358/520 |
| 5,479,255 A | * | 12/1995 | Denny et al. | 356/319 |
| 5,724,160 A | * | 3/1998 | Brandestini et al. | 358/475 |
| 5,731,988 A | * | 3/1998 | Zandi et al. | 382/167 |
| 5,878,195 A | * | 3/1999 | Mahy | 358/1.9 |
| 5,923,774 A | * | 7/1999 | Ostromoukhov | 382/162 |
| 6,021,216 A | * | 2/2000 | Sathe et al. | 382/166 |
| 6,044,172 A | * | 3/2000 | Allen | 382/166 |
| 6,208,752 B1 | * | 3/2001 | Palmadesso et al. | 382/155 |
| 6,578,712 B2 | * | 6/2003 | Lawandy et al. | 209/3.3 |
| 6,678,048 B1 | * | 1/2004 | Rienstra et al. | 356/419 |
| 6,678,406 B1 | * | 1/2004 | Mojsilovic et al. | 382/162 |

FOREIGN PATENT DOCUMENTS

DE      41 19 489 A1      11/1991

\* cited by examiner

*Primary Examiner*—Madeleine Nguyen
(74) *Attorney, Agent, or Firm*—McGlew and Tuttle, P.C.

(57) ABSTRACT

A multispectral color reproduction systems in which the spectral distribution of the light reflected by an exposed image, which distribution contains the color information, is recorded dot by dot and is coded in the form of a linear decomposition into weighted basic functions with multispectral coefficients as weighting coefficients and is transmitted to an image reproduction device, where a decoding takes place. The multispectral coefficients of the linear spectral display is nonlinearly distorted in a coding system adapted to the human color distinction capacity, wherein the distortion is made dependent on all or individual dominant amplitudes of the multispectral coefficients and the distortion is again canceled in a decoding system. This may be embodied by based on multidimensional look-up tables or by use of a system with distortion and correction functions controlled in a stepwise manner. The coding be based on only the differences of nonlinearly distorted amplitudes being transmitted to estimated values.

12 Claims, 8 Drawing Sheets

MULTISPECTRAL COLOR REPRODUCTION SYSTEM WITH NONLINEAR CODING

FIELD OF THE INVENTION

The present invention pertains to a multispectral color image reproduction system.

BACKGROUND OF THE INVENTION

Multispectral color image reproduction systems have been known for a rather long time and they represent an alternative to the prior-art processes of the color image reproduction technique with three color channels called three primary systems below for the scanning, transmission and reproduction of color value signals, e.g., on a display screen. Color values are understood as color values of the CUE 1931 standard observer such as XYZ or linear transformations of them such as RGB throughout the text below:

SUMMARY AND OBJECTS OF THE INVENTION

The primary object of the present invention is to substantially reduce the large amount of data for representing every individual spectral color stimulus of the color captured by an observer without the noticeable loss of the color information visible to the observer.

The primary object according to the present invention is achieved by the linear multispectral values representing spectral color stimuli being nonlinearly distorted in a coding system adapted to the human color distinction capacity, wherein the distortion is made dependent on all or individual dominant amplitudes of the linear multispectral values and the distortion is inverted in a decoding system.

The present invention can be embodied by means of multidimensional look-up tables or by means of a system with distortion and inverted distortion functions controlled in a stepwise manner. An embodiment with predictive coding, in which only the differences of nonlinearly distorted amplitudes are transmitted to estimated values, is particularly advantageous.

According to the invention, a multispectral color reproduction system is provided with a recording unit for measuring the spectral colors stimuli with a spectral color scanner and a coding and decoding system for an efficient digitized display of the spectral color stimuli by multispectral values in a data format of K values, wherein the first three values can be linear combinations of color values determined by weighing the color stimuli with the color matching functions of the CIE 1931 standard observer to preserve compatibility with conventional three primary color reproduction technique and the linear multispectral values are weighting values of a linear decomposition of defined basis functions and the basis functions may also be defined orthogonally. The K linear multispectral values are additionally distorted nonlinearly in the coder and are then transmitted at shorter binary word length and are undergoing a nonlinear transformation again in the decoder, the distortion characteristic of the decoder being the inverse character of the decoder, and the distortion characteristic of every individual value can be made dependent on all other multispectral values.

The nonlinear distortion and the assignment to binary coded words in the coder and the inverted distortion in the decoder may be built up by means of a K-dimensional table with the linear multispectral values as input addresses and with the distorted values as entries to the addresses and the inverted distortion is performed by means of a corresponding inverse table.

The nonlinear distortion and the assignment of binary words and the inverted distortion into K linear multispectral values in the decoder may be performed stepwise, starting with the multispectral value having the greatest effect on perceptibility, and all other multispectral values can be quantized according to declining effect on perceptibility and as a function of the previously distorted values and the corresponding inverse operations are performed stepwise in the decoder.

Three of the linearly coded input values of the nonlinear distortion may be a linear transformation of color values determined from the color stimuli, e.g., the standard color values XYZ or the RGB values of a standardized RGB color space, and thus there is compatibility with conventional primary systems due to three multispectral values.

A stepwise coding and decoding may be performed corresponding such that estimated values are formed from the already coded values for the respective values of higher order, and only the differences between the estimated values and the current values are transmitted and the estimated values are again added stepwise to the differences in the decoder and the output values are formed from this as multispectral values after inverted distortion.

Contrary to prior-art color scanners with three color scanning channels and three color signals at the output, the full spectral information of every picture element is consequently represented here by scan values, and the number of scan values may be on the order of magnitude of N=9 to N=16 or even N=32 in practice. A detailed description of a multispectral scanner can be found, e.g., in the patent DE 41 19 489 A1 which is hereby incorporated by reference.

The advantages of this recording technique over the prior-art technique with three color channels are also described in this patent in detail. These are essentially the avoidance of a number of systematic problems which arise in the three-channel technique due to an insufficient imitation of the theoretical color mixing curves and due to the mesmerism properties of the colors in images or natural scenes. The above-described multispectral technique can also be used, in principle, for the reproduction of natural images instead of original images.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
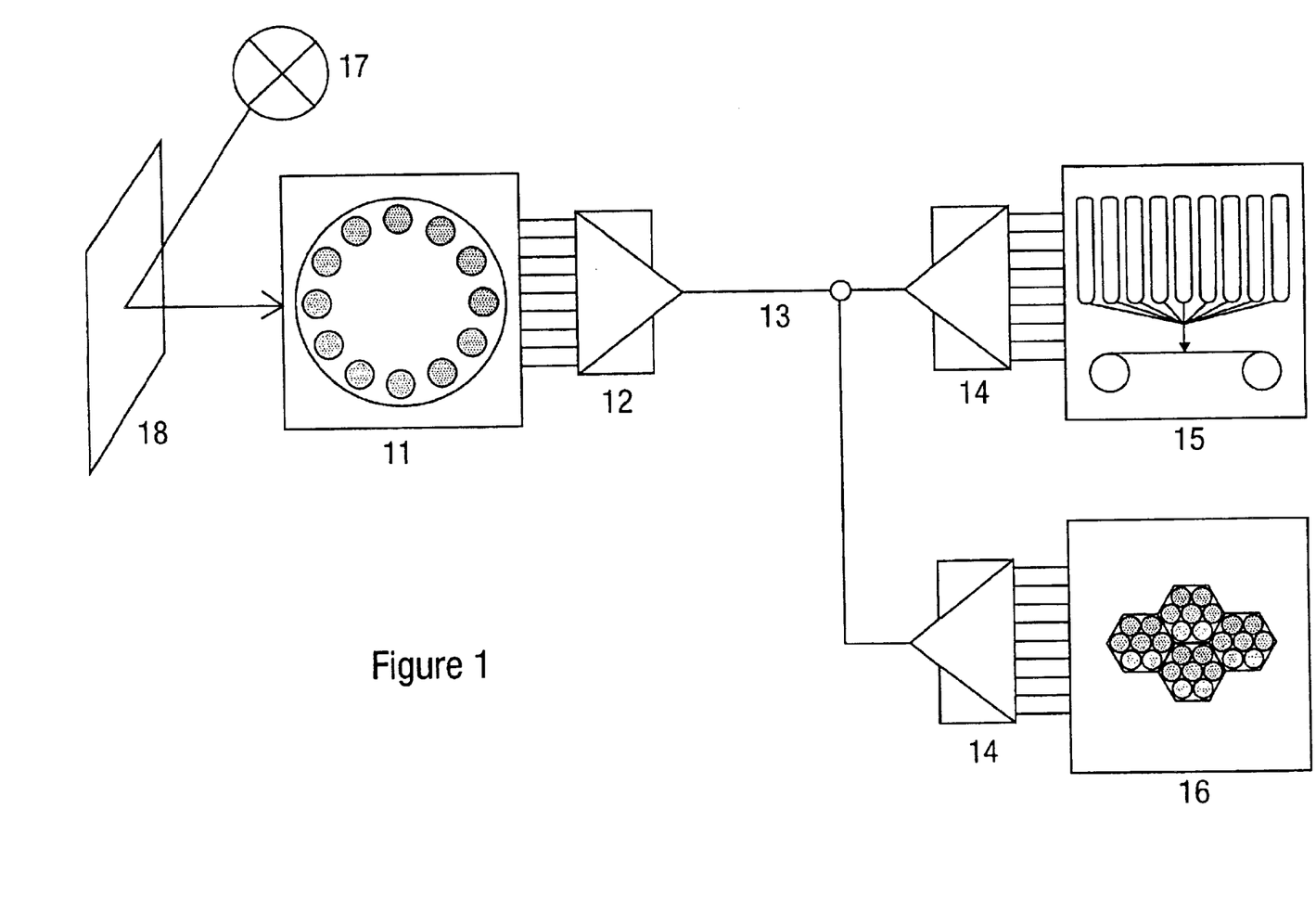
FIG. 1 is a system diagram showing a multispectral color image reproduction system according to the invention.

Referring to the drawings in particular, a multispectral color image reproduction system comprises, according to FIG. 1, a multispectral scanner 11, a coding means 12, a transmission channel 13, a decoding means 14, and a multispectral reproduction means, e.g., a multispectral printer 15 or a multispectral display screen 16. The original image 18 exposed with a broad-band light source 17 is scanned by a multispectral scanner 11 picture element by picture element During this scanning operation, the spectral distribution is measured in the scanner from the light reflected by each picture element of the original and is made available at the output in the form of N scan values usually after standardization to the spectral distribution of the light source 17. The scan values will then describe the spectral reflectance function of each picture element of the original 18 or are understood as a spectral color stimulus function of each picture element for the standard illuminant E.

Contrary to prior-art color scanners with three color scanning channels and three color signals at the output, the full spectral information of every picture element is consequently represented here by scan values, and the number of scan values may be on the order of magnitude of N=9 to N=16 or even N=32 in practice.

The advantages of this recording technique over the prior-art technique with three color channels are essentially the avoidance of a number of systematic problems which arise in three primary techniques due to an insufficient imitation of the theoretical color matching curves and due to the mesmerism properties of the colors in images or natural scenes. The above-described multispectral technique can also be used, in principle, for the reproduction of natural images instead of original images.

The spectral information of the picture elements of a scanned image is reproduced according to FIG. 1 at the end of a reproduction chain by a multispectral printer 15 or a so-called multispectral display screen 16. The spectral distribution of the spectral reflectance factor, as it was present in the scanned original image 18, is approximated picture element by picture element in a multispectral printer 15, e.g., by a mixed printing with more than three colors (typically 6 or more colors). To solve this problem, so-called "multi-ink printers," are used as are described in e.g., U.K., 123, 133 (R. S. Berns: Challenges for Color Science in Multimedia Imaging. Proc. CIM '98 Colour Imaging in Multimedia, 1998, Derby), which are currently being developed.

An essential problem of a multispectral reproduction system is the very large amount of data that is needed to describe the spectral distribution of the reflectance factor of every picture element at the output of the multispectral scanner and for transmission to the reproduction device. If, e.g., the typical value of 16 scan values is used for an image with 1,000×1,000 picture elements, a total of 16 million values are used to describe the image. If each value is represented in a linear binary code, e.g., by signals with 16-bit resolution, the image requires a total of 32 MBytes for the description. A picture of the size of a DIN A4 page with a typical resolution of 2,000×3,000 picture elements would correspondingly require an amount of data equaling 192 MBytes. In contrast, a comparable DIN A4 image in the three range process requires only about 18 MBytes, i.e., a fraction of the above amount.

To reduce this large amount of data, various concepts were developed in the past years, which code the spectral information in a suitable manner such that a smaller amount of information is necessary. These concepts are based on methods of linear algebra and are optimized according to the statistical affinities of the spectral stimuli of (typical) colors from the environment, photographic or printed colors in images, taking into account the different color perception of human observers and various lighting situations during the viewing of reproduced images.

A typical process of this type is described in U.K., 63, 73 (F. König and W. Praefeke: A multispectral scanner. Proc. CIM '98 Colour imaging in Multimedia, 1998, Derby). The spectral distribution $\phi(\lambda)$ as a function of the wavelength $\lambda$ is developed according to this process into a sun of weighted, so-called basic functions $b_k(\lambda)$ according to the formula:

$$\phi(\lambda)=\Sigma_k a_k \cdot b_k(\lambda)$$

The basis functions are optimized according to a large number of sample spectra such that the smallest possible approximation error of the spectrum is generated with the smallest possible number of superimposed basis functions. A typical process for this is the Principal Component Analysis (PCA).

The use of orthogonal basis functions, which meet the condition $$\int_{\text{start of visible range}}^{\text{end of visible range}} b_i(\lambda) \cdot b_j(\lambda) d\lambda = 0 \text{ for } i \neq j$$

(i.e. integrated over the visible range) is especially useful. The weighting coefficients $a_k$ can then be developed for each spectrum according to the simple formula:

$$a_k \int_{\text{start of visible range}}^{\text{end of visible range}} \phi(\lambda) \cdot b_k(\lambda) d\lambda$$

Figure 2:
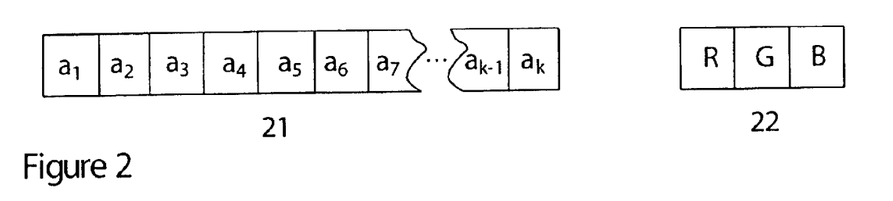
FIG. 2 is a view showing a data format of describing spectral color stimuli.

(i.e. integrated over the visible range). The weighting coefficients are called multispectral coefficients $a_k$. The spectral color information of an image is then described with these multispectral coefficients in the data format 21 shown in FIG. 2 below, which replaces the format 22 for the three-color display with standard color values or the prior-art RGB components of a conventional three primary format.

Practice shows that an efficient representation is already made possible with the coding process described. About 6 to 10 linear multispectral values are sufficient for most cases occurring in practice for a sufficiently accurate description of the spectral color information of images. However, the total amount of information is still rather large if the accuracy with which the multispectral values must be described in practice in a linear binary code is taken into account. A detailed investigation U.K., 63, 73 (F. König and W. Praefeke: A multispectral scanner. Proc. CIM '98 Colour imaging in Multimedia, 1998, Derby), shows, e.g., that about 10 bytes (80 bits) are still necessary for the representation of the spectral reflectance function or spectral color stimuli in images per picture element.

Figure 3:
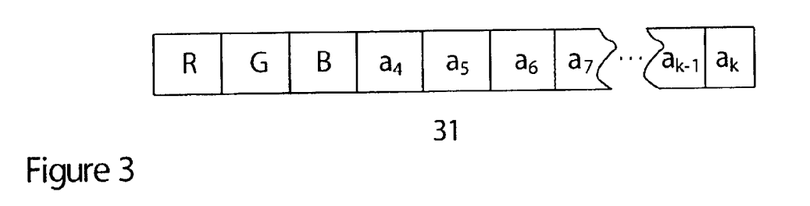
FIG. 3 is a view showing a data format of linear multispectral values wherein the first three are derived from basis functions $b_1(\lambda)$, $b_2(\lambda)$ and $b_3(\lambda)$ of the orthogonal system are selected in this format from a linear combination of the spectral matching functions $\bar{x}(\lambda)$, $\bar{y}(\lambda)$ and $\bar{z}(\lambda)$ of the colorimetric standard observer.

Besides a minimization of the amount of information for representing the spectral information, another important point is to be borne in mind The introduction of a multispectral image reproduction technique besides the conventional technique with three color primaries can be successful only if compatibility is present between the two processes and the reproduction of an image from a multispectral representation is also possible according to the conventional process without a major additional calculation effort This compatibility is made possible according to the process proposed in U.K., 63, 73 (F. König and W. Praefeke: A multispectral scanner. Proc. CIM '98 Colour imaging in Multimedia, 1998, Derby) by the following data format According to FIG. 3, the first three basis functions $b_1(\lambda)$, $b_2(\lambda)$ and $b_3(\lambda)$ of the orthogonal system are selected in this format as a linear combination of the basic spectral matching curves $\bar{x}(\lambda)$, $\bar{y}(\lambda)$ and $\bar{z}(\lambda)$ of the colorimetric standard observer. The associated multispectral values $a_1$, $a_2$ and $a_3$ are correspondingly correct color values in terms of colorimetric. They can be converted by another linear transformation of the form $$\begin{matrix} R \\ G \\ R \end{matrix} = \begin{matrix} t_{1,1} & t_{1,2} & t_{1,3} \\ t_{2,1} & t_{2,2} & t_{2,3} \\ t_{3,1} & t_{3,2} & t_{3,3} \end{matrix} \cdot \begin{matrix} a_1 \\ a_2 \\ a_3 \end{matrix}$$

into any known color space, e.g., also into a standardized RGB color space. This is shown as an example in the data format 31 in FIG. 3. This data format consequently consists of three first values {R, G, B} of a standardized color space and additional multispectral values of a higher order, which represent the entire spectral information in the coded form together with the first three values.

The reproduction of the color information can be performed such that only the first three values are used for a conventional reproduction according to the three-channel process or a conversion of the first three values into multispectral values is performed with a defined 3×3 matrix and the entire spectral reflectance or spectral color stimulus of a picture element is decoded from this together with the higher-order values for a multispectral reproduction of higher quality.

Another substantial drawback even of this prior-art data format, which is compatible with the conventional color representation, is that a relatively large amount of information in terms of bytes is necessary to describe the spectral information with sufficient accuracy.

A process is therefore proposed according to the present invention which is based on an additional nonlinear, i.e., distorted representation of multispectral values, wherein the human perception of differences in the spectral distribution of a light stimulus is taken into account in the distortion and is optimized such that the coded multispectral values describe only the differences perceptible to an observer. The essential advantage of this coding process over the prior-art, purely linear coding processes is a considerable reduction in the amount of data for the representation of the spectral information, without any loss of spectral information visible to the human observer or corresponding losses of color information taking place in a reproduction system due to the coding.

These aspects present invention will be explained in greater detail below on the basis of FIGS. 4 through 7 and exemplary embodiments will be described.

Figure 4:
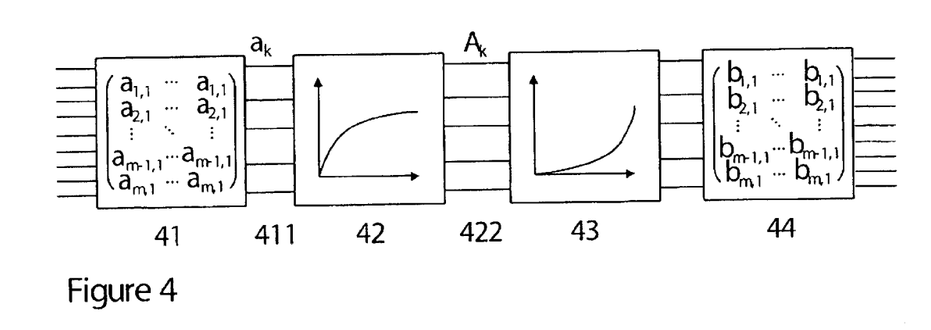
FIG. 4 is a block diagram of a coder and decoder according to the present invention.

FIG. 4 shows a block diagram of a coder and decoder according to the present invention. In principle, the spectral information is first decomposed linearly into basis functions with the multispectral values $a_k$ as weighting coefficients at the input of the coder in block 41 according to the prior-art process. The output signal of this block thus represents a linear transformation of the spectral distribution at the input with the data in format 411. The multispectral values are then subjected to a nonlinear transformation in block 42. The distorted multispectral signals $A_k$ are outputted at the output of the nonlinear coder in data format 422. These are transmitted in the reproduction system to the site of reception and pass through a corresponding decoding there by means of a reversed nonlinear distortion unit 43 and a linear decoding unit to reconstruct the spectral distribution in block 44. Corresponding to the object of the present invention, the nonlinearly coded multispectral signals $A_k$ have a lower amplitude resolution, i.e., they are represented by values in bit/amplitude with shorter word length than the linear multispectral input values $a_k$.

The present invention may also be applied, in principle, to an input data format in which the first three multispectral values represent linear combinations of the basic spectral matching curves and thus there is compatibility with color values determined by three primaries via the first tree multispectral values.

In a first embodiment, the coder 42 comprises a table, which is addressed with the input values {$a_1, a_2, \ldots, a_k$} as input addresses and assigns an output value {$A_1, A_2, \ldots, A_k$} with reduced word length to each address. The best possible coding can be achieved with this process if all entries in the table are optimized for a large number of spectral distributions of the possible colors processed in the system and for a large number of observers for evaluating the reproduced colors such that a minimum word length in bits is reached for the output values of the coder {$A_1, A_2, \ldots, A_k$}.

A representative selection of persons, who reflect the range of variation of the natural color perception ability from differences of the spectral color stimuli, shall be selected as observers for this. Furthermore, various typical lighting situations must be included for the viewing of reproduced images.

An inverse table, which assigns an output value in linear coding ($a'_1, a'_2, \ldots, a'_k$) to each combination of the nonlinearly distorted values {$A_1, A_2, \ldots, A_k$}, is used for the decoding. Of course, not all possible combinations of the amplitude steps of the input values {$a_1, a_2, \ldots, a_k$} are generated any more, as at the input, because of the reduction of the possible amplitude steps, but only combinations are outputted that cannot be distinguished by the observer from the original combinations.

The advantage of the high accuracy of this global coding is associated with the drawback of this first embodiment, namely, that the dimension of the tables that is necessary in practice becomes very large.

Figure 5:
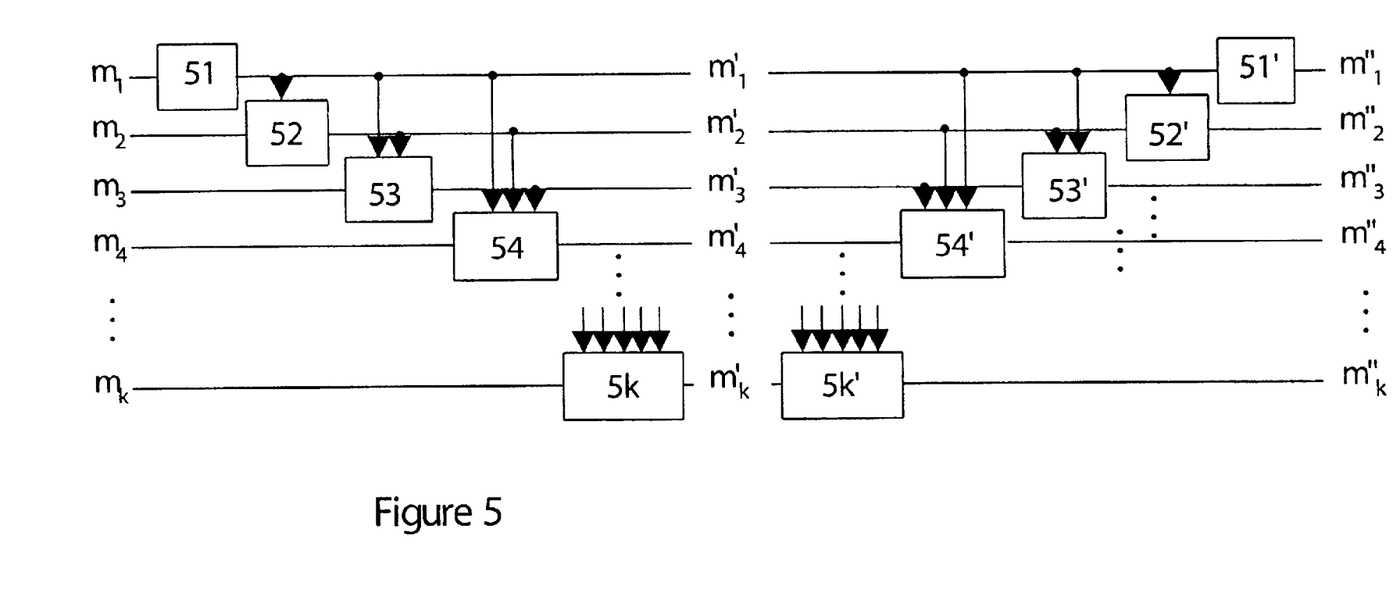
FIG. 5 is a block diagram of another simplified embodiment of a nonlinear coder according top the invention.

Another simplified embodiment of the nonlinear coder is shown in FIG. 5. This embodiment uses a stepwise coding and decoding. The linear multispectral values {$m_1, m_2, \ldots, m_k$} at the input are imaged stepwise nonlinearly, preferably beginning with a multispectral value in block 51, which has the strongest effect on the color perception Depending on this first distorted multispectral value, another multispectral value is subsequently coded in block 53, which has the second strongest effect on the color perception. The multispectral values with gradually decreasing effect on color perception are then distorted stepwise in the blocks 53 through 5K as a function of the already distorted value of higher dominance. The decoding takes place in a corresponding, reversed order with the inverse blocks 5K' through 51'.

Figure 6:
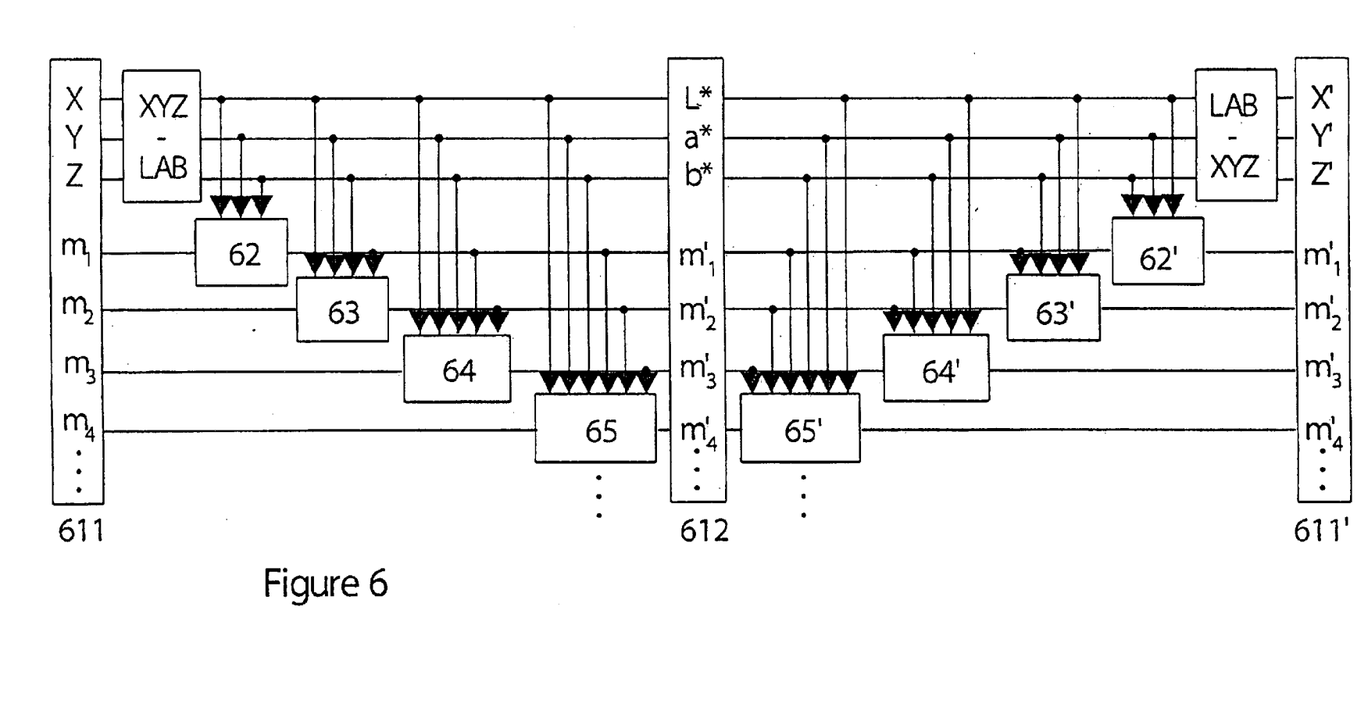
FIG. 6 is schematic view of a particularly advantageous embodiment of a stepwise coding.

One particularly advantageous embodiment of such a stepwise coding is schematically shown in FIG. 6. It is assumed in this embodiment that a linearly coded, compatible data format 611, in which the first three multispectral values correspond to the standard color values XYZ, is used at the input. The Y component represents the brightness signal in this data format.

It is known that an approximately equidistant color space CIELab space with the three components L* as the brightness signal, a* as the perceived red-green chromaticity and b* as the perceived blue-green chromaticity can be assigned to these color values by an analytically defined transformation (see CIE 1986a, Colorimetric. CIE Pub. 15.2., 2nd ed., Commission Internationale de l'Eclairage, Vienna, 29, 30 which is incorporated herein by reference).

It is therefore proposed according to the present invention in the embodiment according to FIG. 6 that the first three multispectral values, which correspond to color values measured by determining the color values for the defined standard observer, be subjected to a nonlinear distortion according to the analytical formulas of the CIELab space and then be raised to the second power and that the other coefficients of higher order be coded stepwise according to the above principle according to the declining order of their effect on perception as a function of the values already distorted before.

One advantage of the application of the CIELab space is the now global acceptance and application of this space in the conventional color reproduction technique. The idea of the present invention to advantageously use this color space as well for the coding of multispectral values can also be extended to the application of any desired, perception-based color space, e.g.,. the standardized CIELuv space or other color spaces described in the literature.

Figure 7:
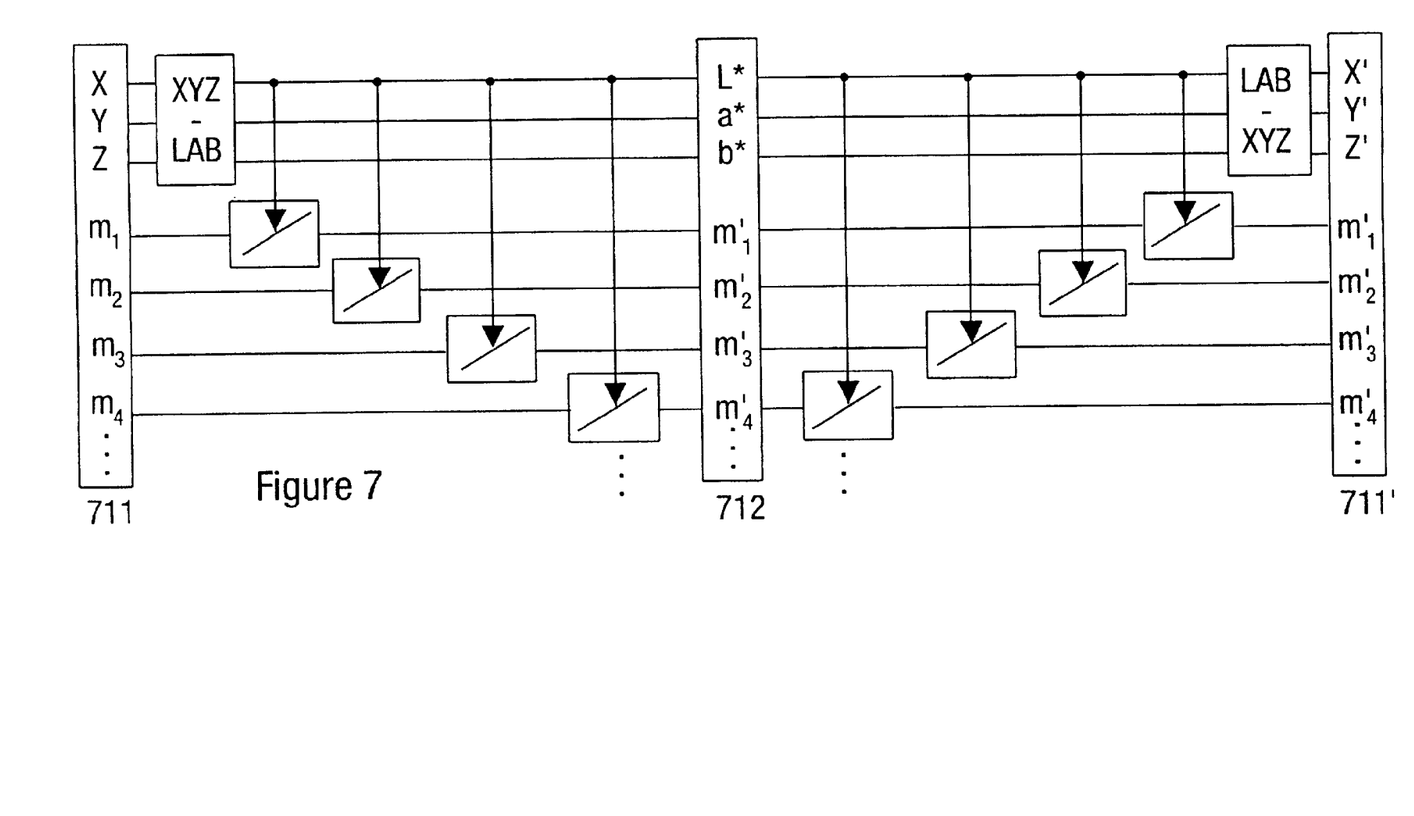
FIG. 7 is a schematic view of an especially simple embodiment of the present invention.

An especially simple embodiment of the present invention is shown in FIG. 7. It is known that differences in the spectral color stimulus are much less perceptible in the case of bright colors than in dark colors. This means that the absolute multispectral values of bright colors are absolutely higher compared with those of dark colors, but, on the other hand, they do not have to be quantized with such a high resolution as the lower absolute multispectral values of dark colors in order to detect all the differences perceptible to an observer.

This dominant dependence on brightness is utilized in the embodiment according to FIG. 7 by the coding of the linear multispectral values of higher order being performed linearly, but with a brightness-controlled slope. The components L*, a* and b* of the CIELab space are selected as examples for the coding of the first three compatible multispectral values. The multispectral values of higher order are quantized, e.g., by value ranges of the brightness signal, graduated with linear characteristics of varying slopes, where the tendency toward the maximum word length can decrease with the order of the multispectral value.

Figure 8:
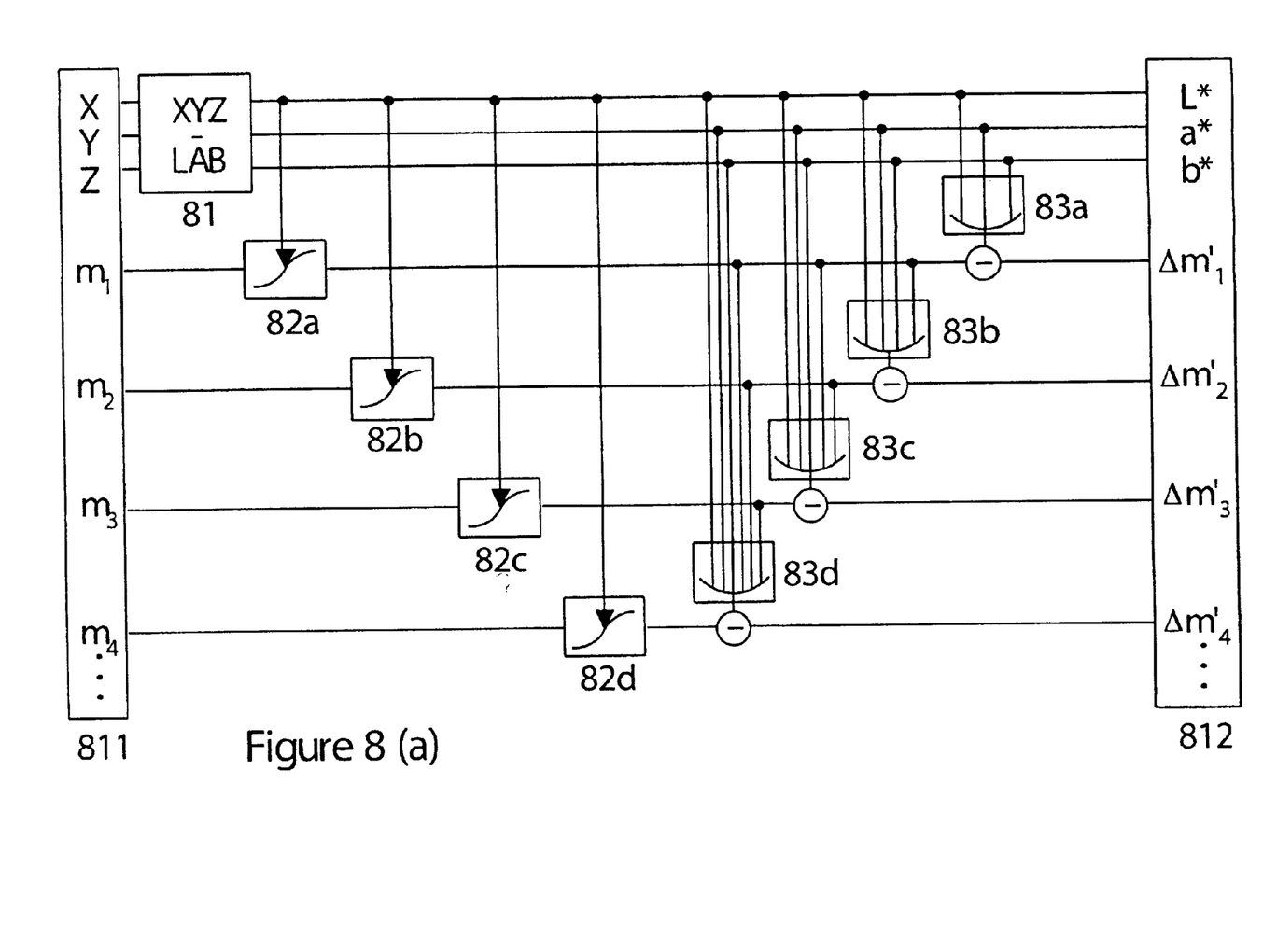
FIG. 8 is a schematic view of another embodiment of the present invention.
Figure 9:
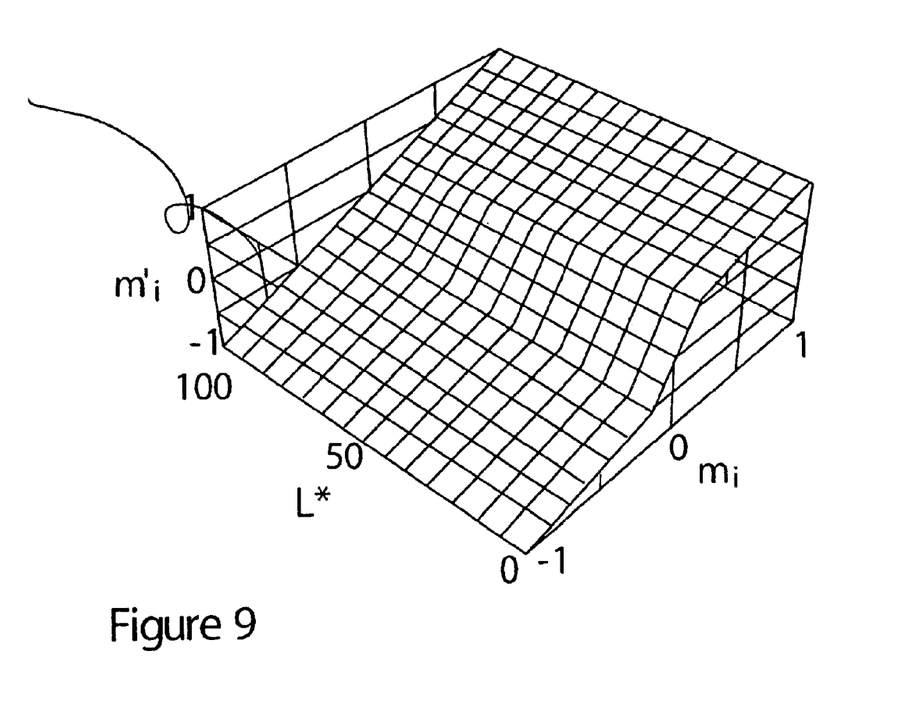
FIG. 9 is a diagram showing a typical distortion function for calculating the distorted multispectral components $m_i'$ as a function of the brightness L and of an input variable $m_L$.

Another embodiment, which permits an especially high compression, is shown in FIG. 8. This embodiment was already embodied in the form of a simulation. A linearly coded, compatible data format (811) is again used. As in the preceding embodiment, the visual component is first coded by means of the CIEL*a*b* system (block 81). The higher-order components are subsequently distorted nonlinearly as a function of L* (blocks 82a–82d). FIG. 9 shows a typical distortion function for calculating the distorted multispectral components $m_i'$ as a function of the brightness L and of an input variable $m_{12}$.

A prediction process is subsequently used to further improve the compression. To do so, the already coded components are used to calculate an estimated value for the component of the next higher order.

Blocks 83a, 83d represent the corresponding estimators. In the simplest case, such an estimator comprises a table (LUT), in which typical estimated values are stored for each combination of input values. These estimated values are calculated in advance as mean values from a large number of typical spectra. Instead of a table, an estimator may also be embodied as a neuronal network, which is trained with a large number of test colors such that the particular most probable values are outputted. Finally, an analytical process may also be used by optimizing, e.g., an n-th order polynomial such that it approximates the test colors with the highest possible accuracy.

After the estimation, only the difference between the estimated value and the actually measured value (data format 812) is transmitted. An estimation is again performed on the reception side (blocks 84a–84n), and the transmitted values are added up for this estimate. An inverse, nonlinear distortion is then performed (blocks 85a, 85n) in order to reconstruct the linear multispectral components. The visual component of the transmitted spectrum is finally reconstructed in block 86.

The amount of data necessary for the transmission can be reduced in the simulation with this process from about 80 bits per spectrum to about 45 bits per spectrum. Consequently, compared with the typical amount of data of 24 bits per picture element for a three-channel system (3·8 bits), the amount of data needed is just barely doubled for the multispectral system.

While specific embodiments of the invention have been shown and described in detail to illustrate the application of the principles of the invention, it will be understood that the invention may be embodied otherwise without departing from such principles.

What is claimed is:

1. A multispectral color reproduction system comprising:
   a recording unit for measuring a spectral color stimuli with a spectral color scanner;
   a coding and decoding system with a coder and decoder for an efficient digitized representation of the spectral color stimuli by a data format with a K linear multispectral values, wherein the K linear multispectral values are weighting factors of a linear decomposition of defined basis functions, and the basis functions may also be defined orthogonal, and a first three linear multispectral values might be a linear combinations of color values determined from the spectral color stimuli with help of spectral color matching functions to preserve compatibility with conventional three primary color reproduction techniques, wherein the K linear multispectral values are additionally distorted nonlinear in the coder and then transmitted using shorter binary word length and are inversely distorted in the decoder, and the distortion characteristic in the coder and decoder can be made dependent on the values of the linear multispectral values.

2. A multispectral reproduction system in accordance with claim 1, wherein a nonlinear distortion and an assignment to binary coded words in the coder is built up by means of a K-dimensional table with a digitized linear multispectral values as input addresses and wherein an inverted distortion into K linear multispectral values in the decoder are performed by means of a corresponding inverse table with the coded binary words as entries to the addresses.

3. A multispectral color reproduction system in accordance with claim 1, wherein a nonlinear distortion of the K linear multispectral values and the assignment of binary words are performed stepwise, starting with the multispectral value having the highest effect on visual color perceptions and wherein all other linear multispectral values can be quantized at reduced word length according to declining effects in visual perception and as a function of the amplitudes of a set of linear multispectral values previously distorted and wherein an inverse operations in the decoder are correspondingly performed stepwise in the opposite direction.

4. A multispectral color reproduction system in accordance with claim 2, wherein the nonlinear distortion of the K linear multispectral values and the assignment of binary words are performed stepwise, starting with the multispectral value having the highest effect on visual color perception, and wherein all other linear multispectral values can be quantized at reduced word length according to declining effects in visual perception and as a function of the amplitudes of a set of linear multispectral values previously distorted and wherein an inverse operations in the decoder are correspondingly performed stepwise in the opposite direction.

5. A multispectral reproduction system in accordance with claim 1, wherein the first three of the K linear multispectral values used to address the coder are a linear transformation of color values such as XYZ or RGB defined by the CIE 1931 standard, to provide compatibility with conventional three primary color systems by using only these first three values of the K linear multispectral values whereas the full set of K values represents the complete spectral color stimulus.

6. A multispectral reproduction system in accordance with claim 2, wherein the first three of the K linear multispectral values used to address the coder are a linear transformation of color values such as XYZ or RGB defined by the CIE 1931 standard, to provide compatibility with conventional three primary color systems by using only these first three values of the K linear multispectral values whereas the full set of K values represents the complete spectral color stimulus.

7. A multispectral reproduction system in accordance with claim 3, wherein the first three of the K linear multispectral values used to address the coder are a linear transformation of color values such as XYZ or RGB defined by the CIE 1931 standard, to provide compatibility with conventional three primary color systems by using only these first three values of the K linear multispectral values whereas the full set of K values represents the complete spectral color stimulus.

8. A multispectral color reproduction system in accordance with claim 1 wherein a stepwise coding and decoding is performed correspondingly such that estimated values are formed for the respective values of higher order from the already coded values of lower order, and only the differences between the estimated values and the current values are transmitted and the estimated values are again added stepwise to the difference in the decoder to form output values from this as linear multispectral values after inverted distortion.

9. A multispectral color reproduction system in according with claim 2 wherein a stepwise coding and decoding is performed correspondingly such that estimated values are formed for the respective values of higher order from the already coded values of lower order, and only the differences between the estimated values and the current values are transmitted and the estimated values are again added stepwise to the difference in the decoder to form output values from this as linear multispectral values after inverted distortion.

10. A multispectral color reproduction system in accordance with claim 3 wherein a stepwise coding and decoding is performed correspondingly such that estimated values are formed for the respective values of higher order from the already coded values of lower order, and only the differences between the estimated values and the current values are transmitted and the estimated values are again added stepwise to the difference in the decoder to form output values from this as linear multispectral values after inverted distortion.

11. A multispectral color reproduction system in accordance with claim 5 wherein a stepwise coding and decoding is performed correspondingly such that estimated values are formed for the respective values of higher order from the already coded values of lower order, and only the differences between the estimated values and the current values are transmitted and the estimated values are again added stepwise to the difference in the decoder to form output values from this as linear multispectral values after inverted distortion.

12. A multispectral color reproduction system in accordance with claim 8 wherein a stepwise coding and decoding is performed correspondingly such that estimated values are formed for the respective values of higher order from the already coded values of lower order, and only the differences between the estimated values and the current values are transmitted and the estimated values are again added stepwise to the difference in the decoder to form output values from this as linear multispectral values after inverted distortion.

* * * * *